(12) United States Patent
Sakamoto

(10) Patent No.: US 6,898,041 B2
(45) Date of Patent: May 24, 2005

(54) METHOD AND APPARATUS FOR MOTOR CONTROL IN A DISK DRIVE

(75) Inventor: Nobuyuki Sakamoto, Ome (JP)

(73) Assignee: Kabushiki Kaisha Kaisha, Tokyo (JP)

( * ) Notice: Subject to any disclaimer, the term of this patent is extended or adjusted under 35 U.S.C. 154(b) by 232 days.

(21) Appl. No.: 10/234,698

(22) Filed: Sep. 5, 2002

(65) Prior Publication Data

US 2003/0103289 A1 Jun. 5, 2003

(30) Foreign Application Priority Data

Nov. 30, 2001 (JP) .................................. 2001-367819

(51) Int. Cl.$^7$ ............................................. G11B 21/04
(52) U.S. Cl. ...................... 360/70; 360/72.1; 360/73.03
(58) Field of Search ...................... 360/70, 72.1, 73.03, 360/73.01, 75, 78.04, 69, 71, 77.01, 77.02, 78.01, 77.05–77.09; 318/39, 49, 50, 51, 561; 369/32

(56) References Cited

U.S. PATENT DOCUMENTS

| | | | | |
|---|---|---|---|---|
| 5,001,578 A | * | 3/1991 | Yamauchi | 360/73.03 |
| 5,157,560 A | * | 10/1992 | Kanda et al. | 360/69 |
| 5,381,279 A | * | 1/1995 | Dunn | 360/70 |
| 5,412,809 A | * | 5/1995 | Tam et al. | 713/324 |
| 5,532,563 A | * | 7/1996 | Kodama et al. | 318/440 |
| 5,594,603 A | | 1/1997 | Mori et al. | |
| 5,801,894 A | * | 9/1998 | Boutaghou et al. | 360/72.1 |
| 5,954,820 A | * | 9/1999 | Hetzler | 713/323 |
| 6,038,096 A | * | 3/2000 | Zhang et al. | 360/78.04 |
| 6,078,158 A | | 6/2000 | Heeren et al. | |
| 6,282,046 B1 | * | 8/2001 | Houston et al. | 360/73.03 |
| 6,342,984 B1 | * | 1/2002 | Hussein et al. | 360/69 |
| 6,411,056 B1 | * | 6/2002 | Ikedo et al. | 318/597 |
| 6,738,213 B2 | * | 5/2004 | Haitani | 360/71 |

FOREIGN PATENT DOCUMENTS

| | | |
|---|---|---|
| JP | 3-109625 | 5/1991 |
| JP | 4-310654 | 11/1992 |
| JP | 5-307829 | 11/1993 |
| JP | 6-4988 | 1/1994 |
| JP | 6-602087 | 10/1994 |
| JP | 7-153208 | 6/1995 |
| JP | 2000-224891 | 8/2000 |
| JP | 2001-57010 | 2/2001 |
| JP | 2001-67779 | 3/2001 |
| JP | 2001-67825 | 3/2001 |

* cited by examiner

*Primary Examiner*—David Hudspeth
*Assistant Examiner*—Jason Olson
(74) *Attorney, Agent, or Firm*—Pillsbury Winthrop LLP (57) ABSTRACT

A disk drive which can be used in particular under a low temperature environment is disclosed. The drive comprises a spindle motor (SPM) being a fluid dynamics bearing motor, and rotates a disk medium by the SPM. When an ambient temperature of the drive has changed to a low temperature, current consumption by the SPM increases to maintain steady rotation of the drive. When a CPU detects that current consumption by the SPM exceeds a specified value, the CPU restricts a current supplied to a voice coil motor (VCM) such that the total current amount does not exceed a specified maximum current capacity of the drive.

11 Claims, 4 Drawing Sheets

METHOD AND APPARATUS FOR MOTOR CONTROL IN A DISK DRIVE

CROSS-REFERENCE TO RELATED APPLICATIONS

This application is based upon and claims the benefit of priority from the prior Japanese Patent Application No. 2001-367819, filed Nov. 30, 2001, the entire contents of which are incorporated herein by reference.

BACKGROUND OF THE INVENTION

1. Field of the Invention

The present invention relates to a field of disk drives which perform read/write operations of data on a disk medium rotated by a spindle motor. In particular, it relates to a motor control technique under a low-temperature environment.

2. Description of the Related Art

Generally, disk storages, represented by hard disk drives (also "disk drives") are configured to perform data read/write operations, using a head (magnetic head), on a disk medium (hereinafter "disk") rotated at high speed by a spindle motor.

In recent years, fluid dynamics bearing motors having stable rotation characteristic have been adopted. Fluid dynamics bearing motors use oil or the like as the bearing, and thus have a characteristic that the power consumption depends on the viscosity of the oil. Specifically, if the temperature lowers, the viscosity of the oil increases, and the power consumption amount (current consumption amount) relatively increases to maintain a rated rotation number.

In the meantime, in particular, small disk drives are gaining popularity as external memories for notebook personal computers, personal digital assistances (PDAs), and digital apparatuses mounted on vehicles, etc. Therefore, the temperature range under which disk drives are used is broadened, thus they may be used under a low-temperature environment.

In consideration of use of disk drives under such a low-temperature environment, if a fluid dynamics bearing motor is adopted as a spindle motor, a power consumption amount relatively increases, and thus it is required to increase a maximum allowable power (current) of the whole drive.

If a disk drive is designed on the premise that it is used under a low-temperature environment, there is a problem that the maximum allowable power (current) of the whole device increases since adopting a fluid dynamics bearing spindle motor increases the current consumption amount. Specifically, if the maximum allowable power increases, a power supply circuit and a motor driver of a large capacity are required, which is inappropriate for a small-size disk drive required to reduce the power consumption. For example, for a motor driver which performs boosting using an inductor, the maximum current influences the size of the inductor, and thus there occurs a problem that it is difficult to mount the inductor on a printed circuit board.

Conventionally, as means for inhibiting the increase in spindle motor power consumption, a method of providing a temperature sensor and heater in the vicinity of the fluid dynamics bearing portion has been proposed. When the temperature sensor senses a change to a low temperature, driving the heater to generate heat (refer to, for example, Jpn. Pat. Appln. KOKAI Pub. No. 6-4988).

This art is aimed at heating the oil used as the fluid dynamics bearing in a low temperature to relatively reduce the viscosity of the oil. However, this method requires providing a temperature sensor and a heater in the vicinity of the bearing of the spindle motor, and a circuit for controlling the heater. This complicates the structure around the motor and raises the number of components, thus also the cost. Further, this method has a problem that disk start-up is delayed, since the drive cannot operate until the oil of the bearing portion reaches a certain temperature by a heater.

BRIEF SUMMARY OF THE INVENTION

The object of the present invention is to provide a disk drive which can normally drive a spindle motor in particular even under a low-temperature environment, and can inhibit increase in the power consumption.

In accordance with one aspect of the present invention, there is provided a disk drive comprising a spindle motor whose current consumption amount relatively increases in particular at a low temperature, the disk drive supplying the spindle motor with a current amount necessary for achieving a rated rotation number, and realizing reduction in current consumption of the whole drive.

The disk drive comprises: a spindle motor which rotates a disk medium; an actuator motor which drives an actuator mounted with a head for performing data read/write on the disk medium; a first motor control device which drives the spindle motor at a rated rotation number by supplying a first current; a second motor control device which drives the actuator motor by supplying a second current; and a controller which performs control to restrict an amount of the second current according to increase of the first current such that the total of amounts of the first and second currents does not exceed a maximum current capacity set in the disk drive and including the first current amount and the second current amount.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to the drawings.

Figure 1:
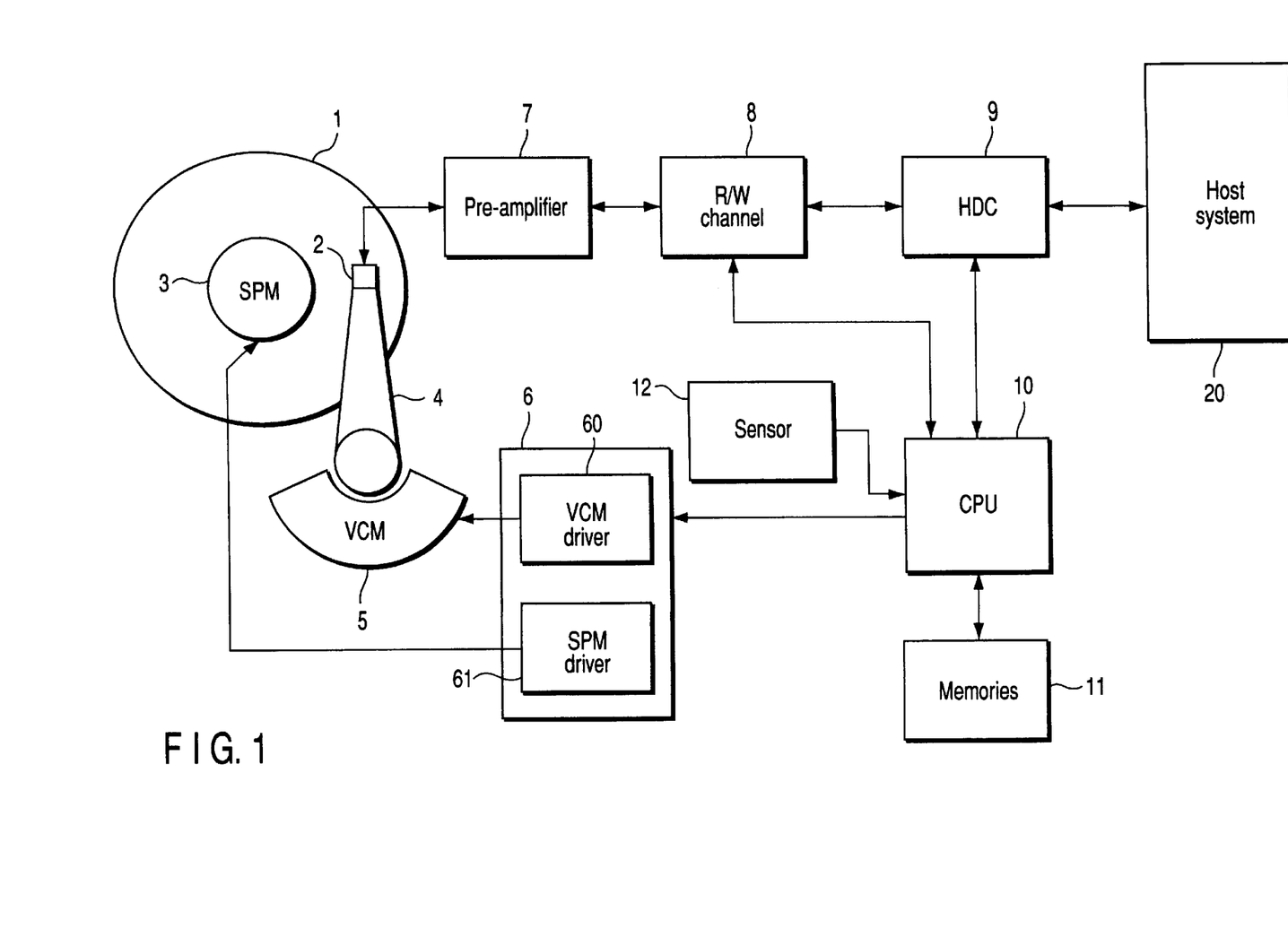
FIG. 1 is a block diagram showing a main part of a disk drive concerning an embodiment of the present invention.
Figure 2:
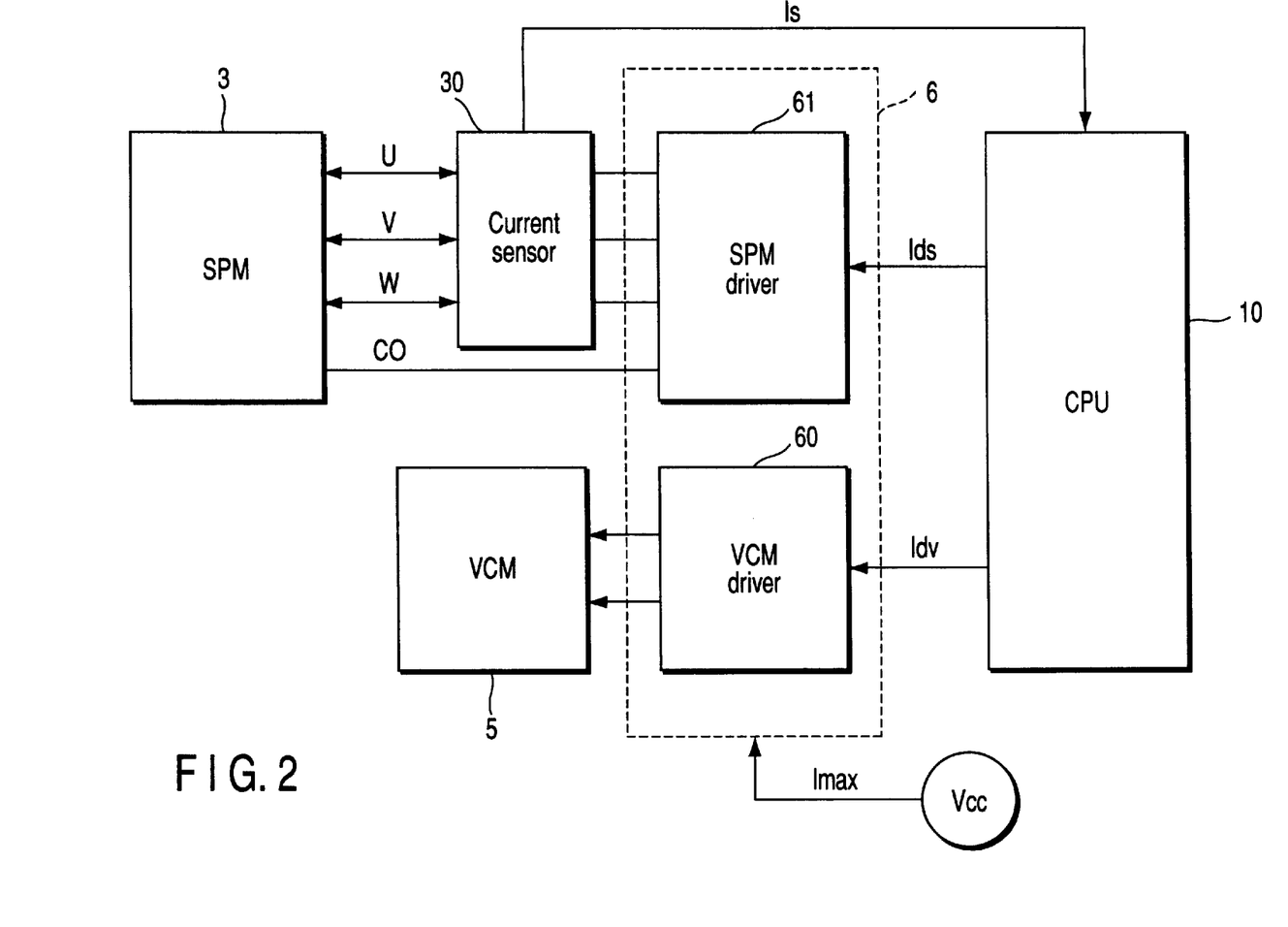
FIG. 2 is a block diagram for explaining a structure of a motor control system concerning the embodiment.

FIG. 1 is a block diagram showing a main part of a disk drive concerning the embodiment. FIG. 2 is a block diagram for explaining a structure of a motor control system incorporated in the drive.

(Structure of the Disk Drive)

The disk drive is supposed to be a hard disk drive using a disk 1 as a magnetic recording medium. The drive uses a fluid dynamics bearing motor as a spindle motor (SPM) 3 which rotates the disk 1.

A magnetic head 2 performs a read/write operation of data for the disk 1 rotated by the SPM 3. The magnetic head 2 is mounted on an actuator 4 which is driven by a voice coil motor (VCM) 5. The magnetic head 2 has a structure in which a read head for performing a read operation and a write head for performing a write operation are separately mounted on a slider.

The actuator 4 is driven and controlled by a servo system mainly comprising a microprocessor 10, and positions the magnetic head 2 in a target position on the disk 1.

A VCM driver 60 included in a motor driver integrated circuit (IC) 6 supplies a drive current to the VCM 5. The motor driver 6 includes an SPM driver 61 together with the VCM driver 60, and is controlled by the CPU 10 (please refer to FIG. 2).

In addition to such a head disk assembly, the disk drive comprises a circuit system having a pre-amplifier circuit 7, R/W channel 8, a disk controller (HDC) 9, the CPU 10 and memories 11.

The pre-amplifier circuit 7 has a read amplifier which amplifies a read signal outputted from the read head, and a write amplifier. The write amplifier converts a write data signal outputted from the R/W channel 8 into a write current signal, and transmits it to the write head. The R/W channel 8 is a signal-processing IC which processes read/write data signals (including servo data signals). The HDC 9 has an interface function between the drive and a host system 20 (for example, a personal computer or a digital apparatus).

The CPU 10 is a main control device of the drive, as described above, and performs a control operation of the servo system, control of normal read-write operations, and motor control concerning the embodiment. The memories 11 include a flash memory, a RAM and a ROM, which store various data and programs necessary for controlling the CPU 10.

Further, the drive comprises a temperature sensor 12 for sensing the temperature in the drive. The temperature sensor 12 senses the temperature at predetermined sampling intervals, and outputs the temperature values to the CPU 10. The CPU 10 detects a change of the temperature to a low temperature concerning the embodiment, according to the sensing result from the temperature sensor 12.

(Structure of Motor Control System)

As shown in FIG. 2, the CPU 10 performs drive and control of the SPM 3 by using the SPM driver 61. Further, the CPU 10 performs drive and control of the VCM 5 by using the VCM driver 60. The SPM driver 61 supplies a three-phase drive current (U, V, W) to a three-phase coil, in accordance with a control command value (control current amount Ids) from the CPU 10, such that the SPM 3 rotates at a rated rotation number. The reference symbol CO denotes a neutral point.

The motor control system has a current sensor 30 for sensing a current consumption amount (Is) of the SPM 3. The CPU 10 monitors the current consumption amount (Is) of the SPM 3 by the output of the current sensor 30.

Figure 3:
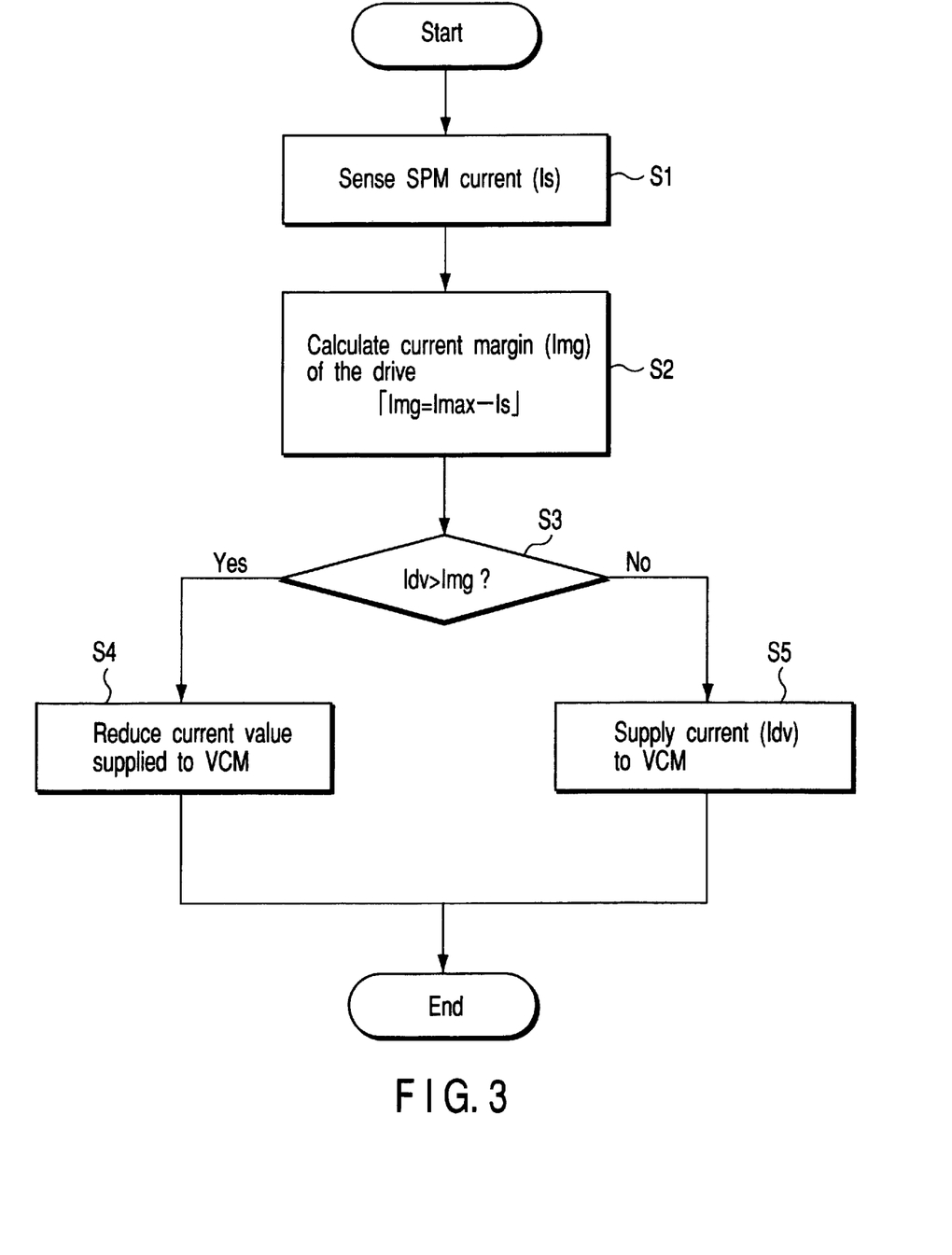
FIG. 3 is a flow chart for explaining a motor control operation concerning the embodiment.

As described below, the CPU 10 has a function of detecting the current consumption amount (Is) of the SPM 3 at the time of servo interrupt, for example, and consequently calculates that the temperature has changed to a low temperature (please refer to FIG. 3). The CPU 10 performs a servo control for controlling and positioning the head 2 to a target position (track to be accessed) on the disk 1, by servo interrupt, before execution of read/write of data by the head 2. In the servo control, the CPU 10 controls a current amount supplied from the VCM driver 60 to the VCM 5 by a control command value (control current amount Idv).

(Motor Control Operation)

A motor control operation in the drive will now be described, mainly with reference to the flow chart of FIG. 3.

Suppose that the disk drive is being driven, and the SPM 3 is driven at its rated rotation number and rotates the disk 1. When the host system 20 issues a read/write command, the CPU 10 recognizes the command through the HDC 9, and changes the operation of the drive to a read/write operation.

The CPU 10 performs a servo control for controlling and positioning the head 2 to a target position (track to be accessed) on the disk 1, before execution of the read/write operation. In the servo control, the CPU 10 detects the current consumption amount (Is) of the SPM 3, on the basis of the sensing result from the current sensor 30 (step S1).

Next, the CPU 10 calculates a residual current capacity obtained by subtracting the current consumption amount (Is) of the SPM 3 from the maximum allowable current (Imax) determined by the specification of the drive, and determines a current margin (Img) (step S2). Specifically, the current margin (Img) indicates a drive current amount which can be used by the drive, excluding the drive current amount (Is) for the SPM 3.

In the meantime, the CPU 10 determines a drive current amount (control command value Idv) for the VCM 5, which is necessary for servo control. The control command value (Idv) corresponds to a current amount supplied to the VCM 5 which drives the actuator 4 to position the head 2 to a target position on the disk 1. The CPU 10 compares the control command value (Idv) with the current margin (Img), and determines whether it is possible to secure the drive current amount for the VCM 5 necessary for servo control (step S3).

If the current margin (Img) exceeds the drive current amount of the VCM 5, the CPU 10 performs normal servo control (NO of step S3). Specifically, the CPU 10 outputs the control command value Idv to the VCM driver 60 to supply the VCM 5 with the drive current amount necessary for the servo control. Thereby, the actuator 4 moves in a radial direction on the disk 1 at predetermined speed, and positions the head 2 to a target position on the disk 1.

In the meantime, if the current margin (Img) is less than the drive current amount of the VCM 5, the CPU 10 calculates that the temperature environment of the drive has changed to a low-temperature state, and the current consumption amount (Is) of the SPM 3 driven at the rated rotation number exceeds the predetermined value (YES of step S4). The predetermined value is a reference current consumption amount which can drive the SPM 3 at the rated rotation number at a standard lower limit temperature.

The CPU 10 reduces the control command value Idv and outputs it to the VCM driver 60, and thereby reduces the drive current amount supplied to the VCM 5 (step S4). Thereby, the actuator 4 moves in a radial direction on the disk 1 at a speed lower than the predetermined speed and positions the head 2 to a target position on the disk 1.

As described above, according to the embodiment, the CPU 10 can detect that the current consumption amount (Is) of the SPM 3 exceeds the predetermined value, on the basis of the sensing result of the current sensor 30. In other words, the CPU 10 can calculate that the temperature environment of the drive has changed to a low-temperature state, and therewith the current consumption amount (Is) of the SPM 3 has increased.

To drive the SPM 3 at the rated rotation number, the CPU 10 gives priority to the current supplied to the SPM 3, and reduces the current amount supplied to the VCM 5. Therefore, even if the current consumption amount (Is) of the SPM 3 increases, it is possible to maintain the maximum allowable current amount (Imax) by reducing the current supplied to the VCM 5 by the increased amount of current consumption amount of the SPM 3. Thereby, even if the temperature lowers under the environment of using the disk drive, it is possible to rotate the disk 1 at the rated rotation number. Further, since it is possible to maintain the maximum allowable electric power determined by the specification of the drive, it is unnecessary to provide the power supply circuit and the motor driver 6 having large capacities.

Further, reduction in the current amount supplied to the VCM 5 causes a situation that the seek speed of the head 2 decreases. However, when the state of driving the SPM 3 and the VCM 5 continues for a designated time, generally the temperature in the drive is raised by heat generated by the driving, and the ambient temperature rises by heating, etc. Therefore, the temperature in the drive becomes a normal standard temperature, and thus it is possible to return the current amount supplied to the VCM 5 to the original predetermined value.

In the embodiment, if priority is given to supplying a current to the SPM 3 with a low-temperature environment and the current supplied to the VCM 5 is limited during read/write operations, as a matter of course the current to the VCM 5 is reduced to a minimum current value by which seek can be performed.

Further, although the embodiment is supposed to be applied to hard disk drives, it is not limited to it, and can also be applied to optical disk drives, as long as the drive uses a spindle motor being a fluid dynamics bearing motor.

To sum up, a current consumption (first current amount) of the SPM 3 is monitored and, if the current amount has increased, it is estimated (calculated) that the temperature environment of the disk drive has changed to a low-temperature state, and the drive current (second current amount) for the VCM 5 is reduced. Therefore, it is possible to supply a maximum allowable current to the SPM 3 and maintain driving of the SPM 3 at the rated rotation number, without increasing the maximum drive electric power at the time of driving the drive.

Specifically, under a low-temperature environment, priority is given to supplying a current to the SPM 3 for rotating the disk medium at a fixed speed, and current supply to the VCM 5 for driving the actuator 4 with the head 2 is reduced. Thereby, it is possible to normally drive the SPM 3, without using any special parts or circuits such as a heater, and inhibit increase in the power consumption (current consumption) of the whole drive. In particular, the invention is useful if it is applied to a disk drive adopting a fluid dynamics bearing motor as its spindle motor, since it can secure stable performance even under a low-temperature environment.

Further, even under a low-temperature environment, if the SPM 3 is driven for a predetermined time at its rated rotation number, generally the temperature in the disk drive rises, and the ambient temperature rises by heating, etc. Therefore, current supply to the VCM 5 can be returned to the normal state.

(Modification)

Figure 4:
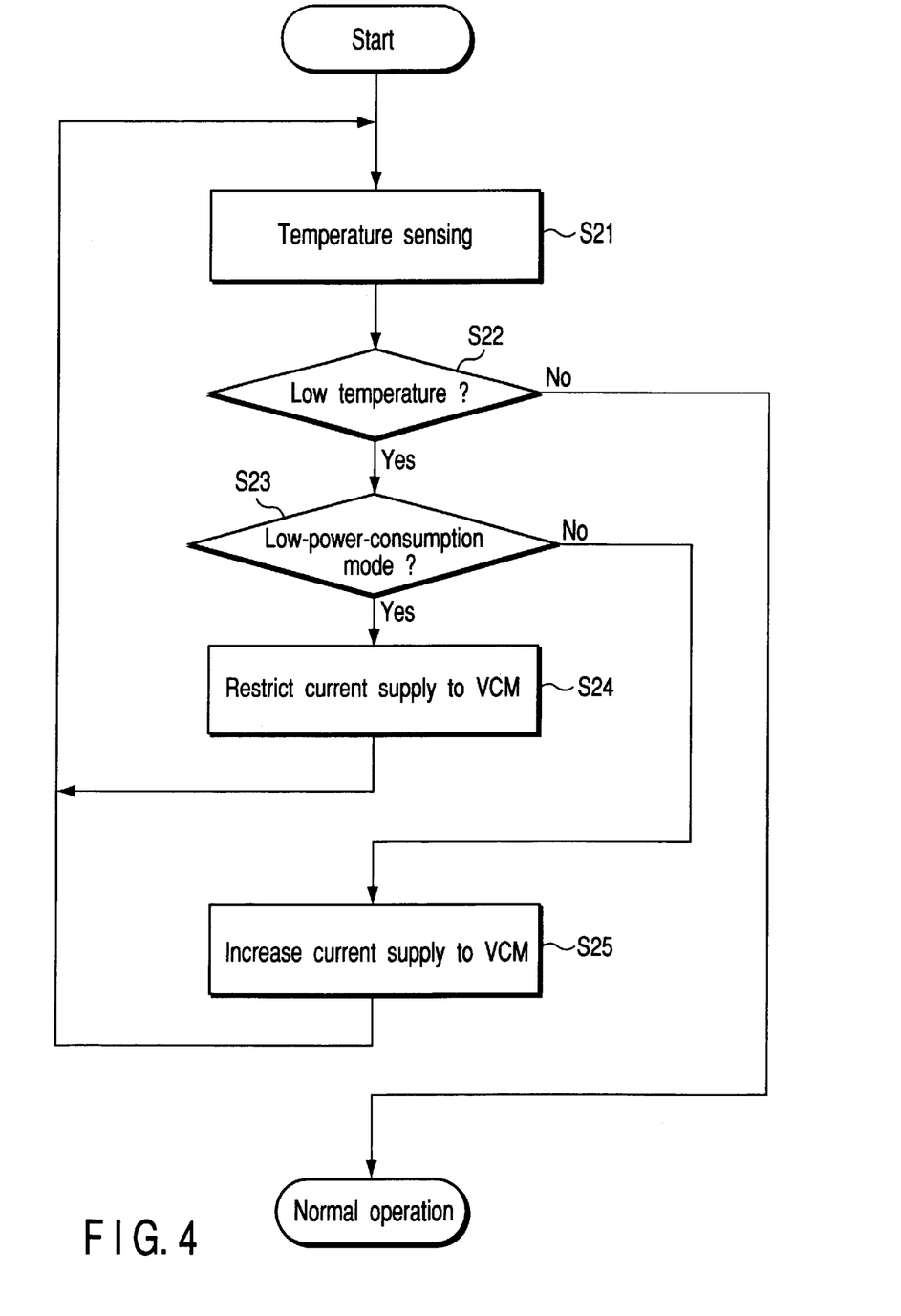
FIG. 4 is a flow chart for explaining a modification of the embodiment.

FIG. 4 is a flow chart for explaining a modification of the embodiment.

The modification relates to a motor control in which a current supplied to the VCM 5 is increased if more power can be consumed (if the drive has a more consumable power), although priority is given to a current supplied to the SPM 3 as described above if the drive is in a low-power-consumption mode.

Generally, if the host system 20 is a notebook personal computer or a PDA, a battery is used as its power source. Therefore, the power which it can consume is limited, and thus usually a low-power consumption mode is set. In comparison with this, even in the case of using a notebook personal computer, if an AC power source is used, the drive can use a relatively large power.

The control will now be described in detail with reference to the flow chart of FIG. 4.

For example, when the disk drive is started, the CPU 10 judges the temperature environment in the drive on the basis of the temperature sensing value from the temperature sensor 12 (step S21). If the temperature environment in the drive falls within the range of a standard temperature, the CPU 10 performs a control by normal operation (NO of step S22).

If the CPU 10 judges that the temperature in the drive is lower than a standard lower limit temperature, the CPU 10 further determines whether a low-power-consumption mode has been set from the host system 20 (step S23). If the low-power-consumption mode has been set, the CPU 10 limits, as described above, a current supply to the VCM 5, and supplies a current to the SPM 3 by priority to drive the SPM 3 at the rated rotation number for as short a time as possible (YES of step S23, and S24).

In the meantime, if the drive is not in the low-power consumption mode and uses, for example, an AC power source, the CPU 10 supplies a current to the SPM 3, and increases a current supplied to the VCM 5 to exceed the predetermined value (NO of step S23 and S25). Specifically, the maximum current (maximum seek speed) of the VCM is increased by boosting, etc, a dummy seek operation is performed even if the host system issues no command. As another way, a maximum current is supplied to the VCM in idling, and thereby the actuator is pressed against an internal stopper or a ramp member, to make the VCM generate heat. In such a case, since no servo control is performed at the start-up time, dummy seek is performed from the most external circumference to the most internal circumference of the disk 1. Further, the VCM 5 is rotated and driven in a direction of pressing the actuator 4 against the ramp member provided on the external circumferential side of the disk 1. The ramp member is a member forming a parking area of the head 2.

By driving the VCM 5 and the SPM 3 as described above, the temperature in the drive rises by heat generation, and it is possible to change the low-temperature state to a normal temperature environment. In particular, by increasing a current supplied to the VCM 5 together with current supply to the SPM 3, it is possible to change the temperature environment in the drive from a low-temperature state to a standard temperature state, in a relatively short time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
   a spindle motor which rotates a disk medium;
   an actuator motor which drives an actuator mounted with a head for performing data read/write on the disk medium;
   a first motor control device which drives the spindle motor at a rated rotation number by supplying a first current;
   a second motor control device which drives the actuator motor by supplying a second current;
   a current sensor which senses a current consumption amount of the spindle motor; and
   a controller which performs control to restrict an amount of the second current according to an increase in the first current such that the total amount of the first and second currents does not exceed a maximum current capacity set in the disk drive and including the first current amount and the second current amount, the controller performing control to restrict the second current amount so as not to exceed a residual current capacity, the residual current capacity being obtained by subtracting the first current amount from the maximum current capacity, according to a sensing result from the current sensor, when the first current amount exceeds a specified value required to achieve the rated rotation number.

2. A disk drive according to claim 1, wherein
   the controller performs control to restrict the second current amount, when the first current amount exceeds a specified value required to achieve the rated rotation number, such that the total of the first current amount and the second current amount does not exceed the maximum current capacity.

3. A disk drive according to claim 1, further comprising a temperature sensor which senses a temperature, wherein
   the controller controls the second current amount when the controller detects, on the basis of a sensing result of the temperature sensor, that the temperature has changed to be lower than a standard lower limit temperature, and thereby reduces a speed of the actuator motor to an allowable limit by the second motor control device.

4. A disk drive according to claim 1, further comprising a temperature sensor which senses a temperature, wherein
   the controller controls the second current amount when the controller detects, on the basis of a sensing result of the temperature sensor, that the temperature has changed to be lower than a standard lower limit temperature, and thereby reduces a speed of the actuator motor to an allowable limit by the second motor control device, and
   the controller performs control to increase the first current amount within a range of a maximum allowable current amount so as to maintain the rated rotation number of the spindle motor.

5. A disk drive according to claim 1, further comprising a temperature sensor which senses a temperature, wherein
   the controller judges whether a low-power-consumption mode of the disk drive have been set or not, when the controller detects, on the basis of a sensing result of the temperature sensor, that the temperature has changed to be lower than a standard lower limit temperature,
   if the low-power-consumption mode has been set, the controller performs control to restrict the second current amount, and
   if the low-power consumption mode has not been set, the controller performs control to increase the second current amount to an allowable limit.

6. A disk drive according to claim 1, wherein
   the spindle motor includes a fluid dynamics bearing motor, and
   the first motor control device performs control to increase the first current amount with reduction in temperature, and maintains driving of the spindle motor at the rated rotation number.

7. A motor control system for a disk drive which includes a spindle motor for rotating a disk medium and a voice coil motor for a head actuator, the system comprising:
   a first motor control device which drives the spindle motor at a rated rotation number by supplying a first current;
   a second motor control device which drives the voice coil motor by supplying a second current;
   a current sensor which senses a current consumption amount of the spindle motor, and
   a controller which performs control to restrict an amount of the second current according to an increase in the first current such that the total amount of the first and second currents does not exceed a maximum current capacity set in the disk drive and including the first current amount and the second current amount, the controller performing control to restrict the second current amount so as not to exceed a residual current capacity, the residual current capacity being obtained by subtracting the first current amount from the maximum current capacity, according to a sensing result from the current sensor, when the first current amount exceeds a specified value required to achieve the rated rotation number.

8. A motor control system according to claim 7, wherein the spindle motor includes a fluid dynamics bearing motor, and the first motor control device performs control to increase the first current amount with reduction in temperature, and maintains driving of the spindle motor at the rated rotation number.

9. A method of motor control for a disk drive which includes a spindle motor for rotating a disk medium and a voice coil motor for a head actuator, the method comprising:

driving the spindle motor at a rated rotation number by supplying a first current;

driving the voice coil motor by supplying a second current;

detecting an increase in an amount of the first current over a specified value to maintain the rated rotation number; and performing control to restrict an amount of the second current according to increase in the first current such that the total of amounts of the first and second currents does not exceed a maximum current capacity set in the disk drive and including the first current amount and the second current amount, and controlling the second current amount, so as not to exceed a residual current amount, the residual current amount being obtained by subtracting the first current amount from the maximum current capacity.

10. A method according to claim 9, further comprising:

detecting whether a temperature has changed to be lower than a standard lower limit temperature, on the basis of a sensing result of a temperature sensor which senses the temperature; and reducing the second current amount, if the temperature detected in the detecting is lower than the lower limit temperature, to reduce speed of the voice coil motor to an allowable limit.

11. A method according to claim 9, further comprising:

detecting whether a temperature has changed to be lower than a standard lower limit temperature, on the basis of a sensing result of a temperature sensor which senses the temperature;

judging whether a low-power-consumption mode of the disk drive is set, if the temperature detected in the detecting is lower than the lower limit temperature; and reducing the second current amount if a low-power-consumption mode of the disk drive is set, and increasing the second current amount if a low-power-consumption mode of the disk drive is not set, in the case where the temperature detected in the detecting is lower than the lower limit temperature.

* * * * *

UNITED STATES PATENT AND TRADEMARK OFFICE
CERTIFICATE OF CORRECTION

PATENT NO. : 6,898,041 B2
DATED : May 24, 2005
INVENTOR(S) : Nobuyuki Sakamoto It is certified that error appears in the above-identified patent and that said Letters Patent is hereby corrected as shown below:

<u>Title page,</u>
Item [73], Assignee, replace "Kabushiki Kaisha Kaisha" with
-- Kabushiki Kaisha Toshiba --.

Signed and Sealed this

Twenty-fourth Day of January, 2006

JON W. DUDAS
*Director of the United States Patent and Trademark Office*